Figure 1:
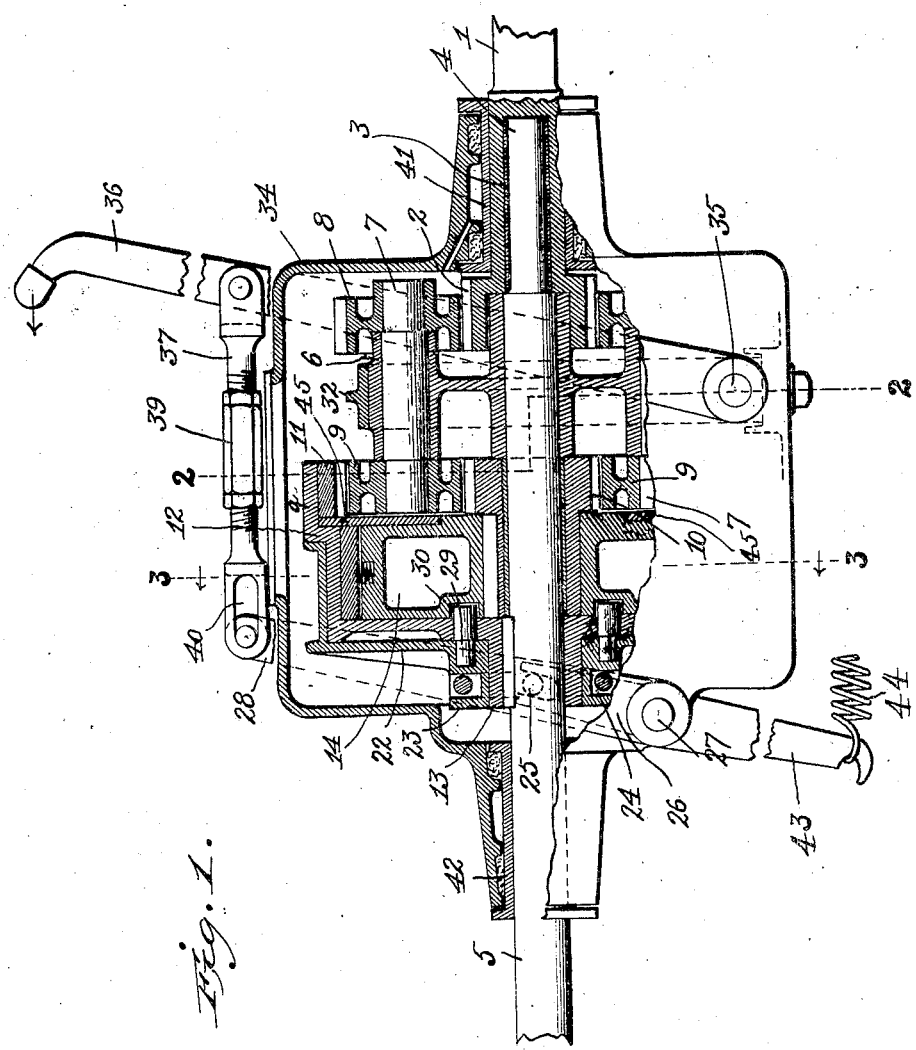

No. 868,935. PATENTED OCT. 22, 1907.
G. D. MUNSING.
SPEED CHANGING MECHANISM.
APPLICATION FILED MAY 23, 1907.

4 SHEETS—SHEET 1.

Witnesses
Edwin L. Jewell
Jesse N. Lutton

Inventor
George D. Munsing
By Henry Ooth Jr.

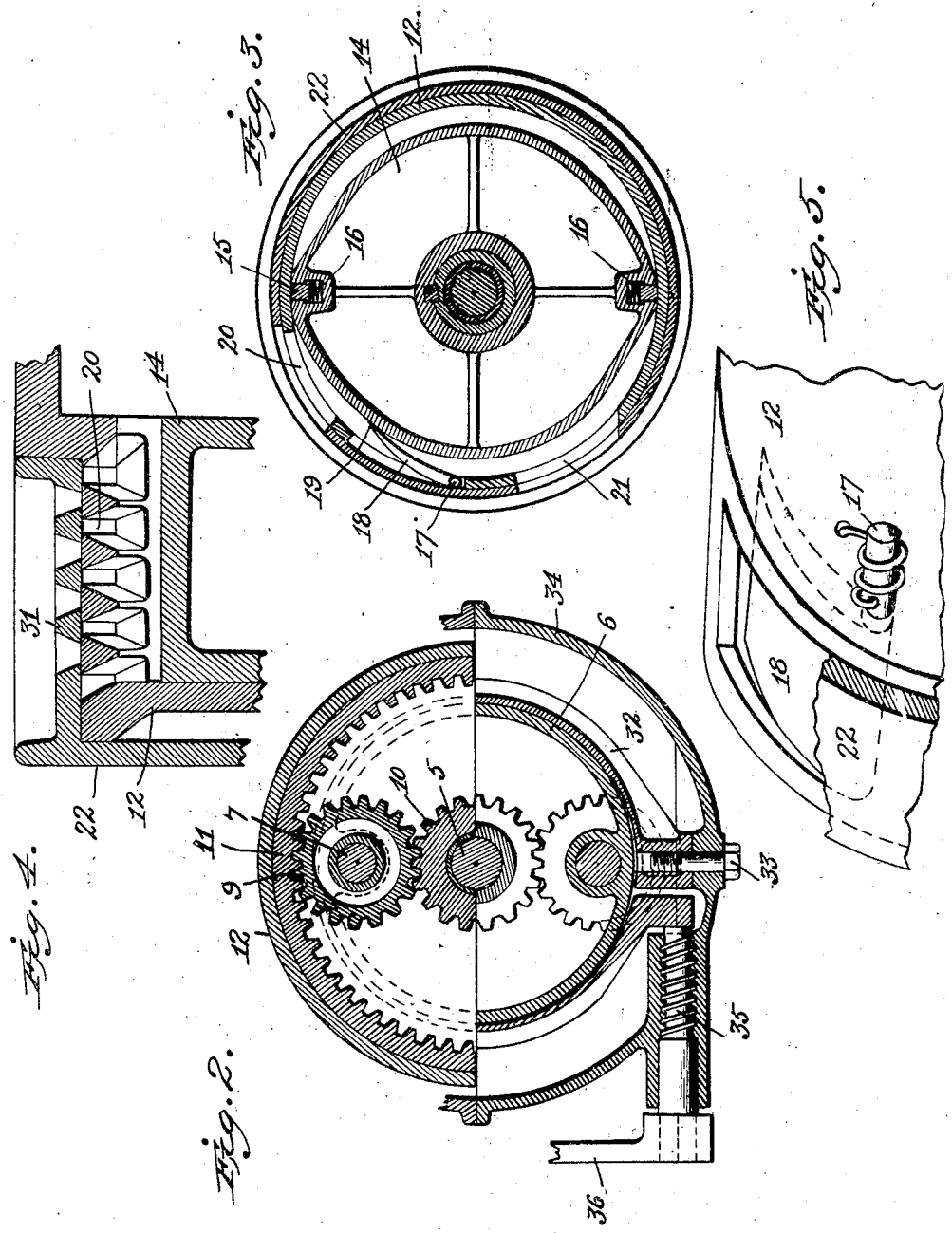

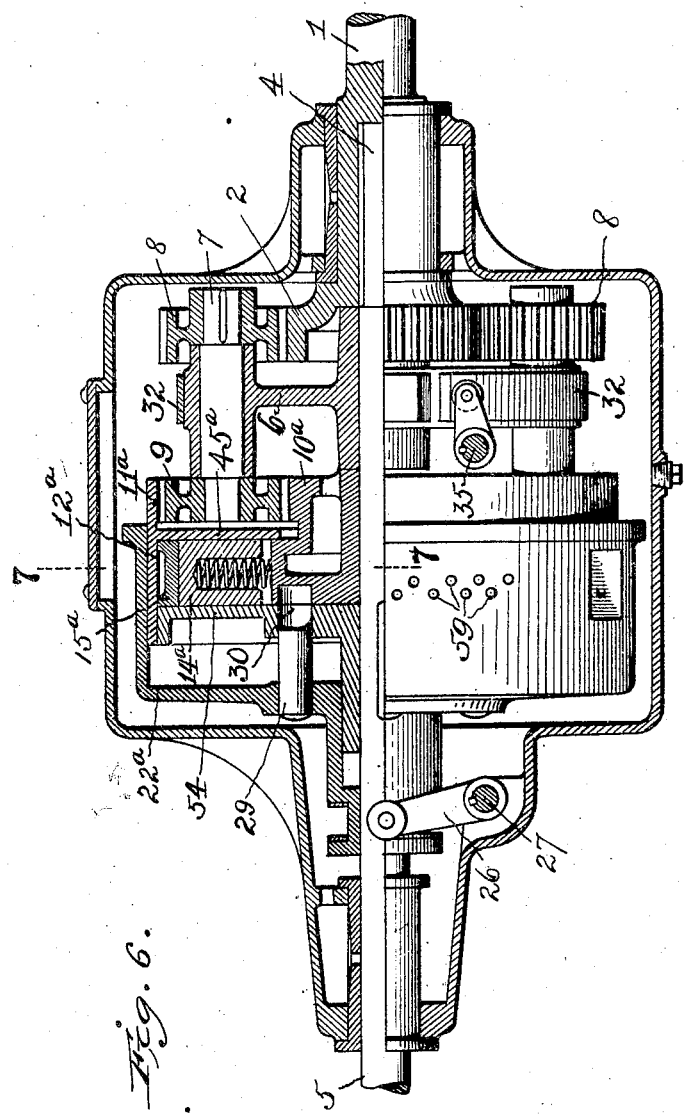

No. 868,935. PATENTED OCT. 22, 1907.
G. D. MUNSING.
SPEED CHANGING MECHANISM.
APPLICATION FILED MAY 23, 1907.
4 SHEETS—SHEET 4.
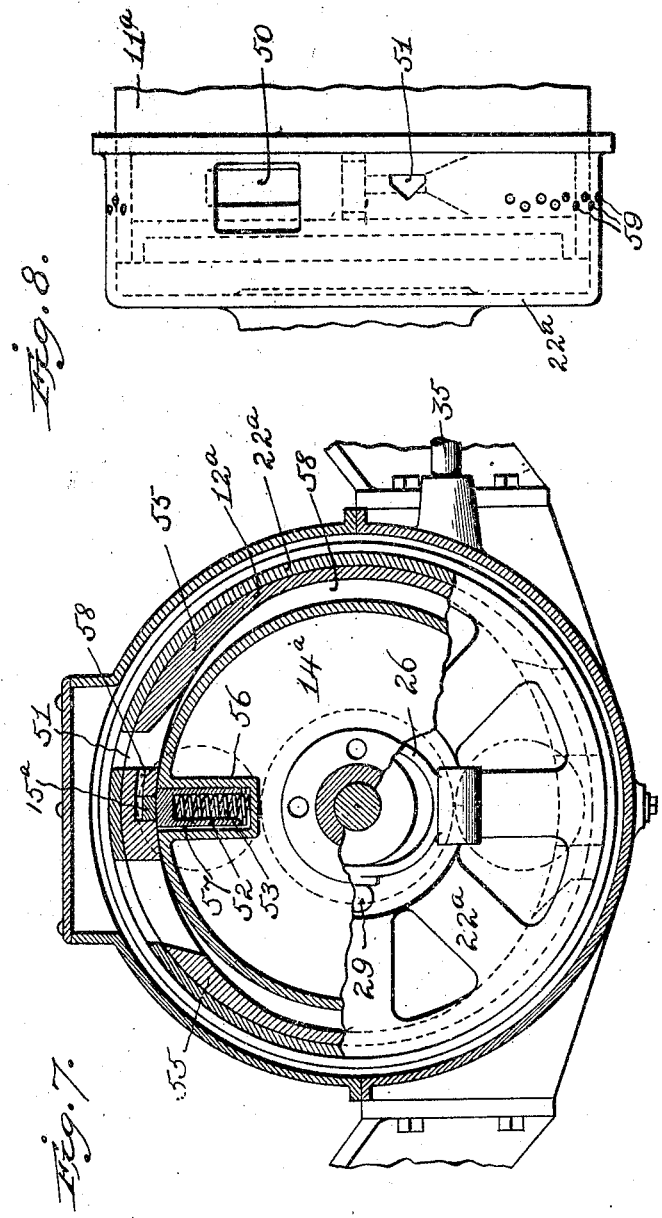
Witnesses
Edwin L. Jewell
Jesse R. Lutton
Inventor
George D. Munsing
By Henry Orth Jr.
Attorney

UNITED STATES PATENT OFFICE.

GEORGE D. MUNSING, OF NEW YORK, N. Y.

SPEED-CHANGING MECHANISM.

No. 868,935.

Specification of Letters Patent.

Patented Oct. 22, 1907.

Application filed May 23, 1907. Serial No. 375,324.

*To all whom it may concern:*

Be it known that I, GEORGE D. MUNSING, a citizen of the United States of America, residing at New York, in the county and State of New York, United States of America, have invented certain new and useful Improvements in Speed-Changing Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to speed changing mechanism, and has for its object to control the speed of the driven part by reason of the slip between the driving and driven parts produced by the venting of the fluid from between them, said fluid being introduced in a suitable manner, as will be hereinafter more particularly described, the speed-changing mechanism or transmission being particularly adaptable to motor vehicles.

Referring to the drawings in which like parts are similarly designated, Figure 1 is a longitudinal vertical section, partly in elevation. Fig. 2 is a section taken on line 2—2 of Fig. 1. Fig. 3 is a section substantially on the line 3—3 of Fig. 1. Fig. 4 is a detail of the valve, and Fig. 5 is a perspective view showing a detail of the fluid retaining member. Fig. 6 is a modification, partly in vertical, horizontal section. Fig. 7 is a section on line 7—7 of Fig. 6, and Fig. 8 is a detail of the valve showing the ports therein.

The driving shaft 1 has secured to or formed on its end a driving gear wheel 2, and has an end recess containing a wear sleeve 3, within which sleeve is journaled the reduced end 4 of the driven shaft 5. Loose on the driven shaft 5 is a brake member 6 constructed as a band brake wheel, in which are mounted shafts 7 preferably, but not necessarily, two in number, and symmetrically disposed around the axis of the brake member. On one end of these shafts are the driven planet pinions 8 gearing with the gear wheel 2 on the driving shaft, and on the opposite ends of these shafts and opposite side of the brake member 6 are the driving planet wheels 9. The driving planet wheels 9 gear on the one hand with a gear wheel 10 loose on the driven shaft 5, and on the other hand with an internally toothed ring 11 forming part of an internal gear wheel. This toothed ring 11 is secured to a pump case 12 whose boss 13 is keyed or otherwise secured to the driven shaft 5.

The pump case is preferably, but not necessarily, formed with a set-off portion at *a* of larger diameter than the pump case proper, and it is in this portion that the toothed ring 11 is secured, said ring serving to hold in place the removable annular wall 45 of the pump case.

Within the pump case 12 is a piston 14, more clearly shown in Fig. 3, of a general elliptical shape, the ends of said elliptically shaped piston being provided with packing members 15, urged into engagement with the circular inner wall of the cylinder 12 by any suitable form of spring, 16. Journaled on the pin 17 in the wall of the cylinder 12 is a movable fluid retaining member 60 or flap valve 18, whose free end 19 slides on the surface of the piston 14. This valve is preferably located between the exhaust ports 20 and inlet port or ports 21.

Mounted on the boss 13 of the piston 12 is an axially slidable valve member 22, whose boss 23 has a peripheral groove in which is mounted a two-part trunnion ring 24 the trunnions 25 of which are engaged by the forked end of the arm 26 mounted on the shaft 27 that is rocked by a lever arm 28. On shaft 27 is keyed an arm 43 urged by a spring 44 that is connected to some fixed part of the motor vehicle or the like, and tends to hold the valve 31 open.

Secured to the valve member 22 are clutch pins 29 that are adapted to enter recess 30 in the piston 14 and act as a positive clutch member. The exhaust ports of the piston are preferably short, peripheral slots 20 controlled by a grid-shaped exhaust valve 31, more clearly shown in Fig. 4, wherein these slots are shown closed by the grid valve, 31.

The brake member 6 is provided with a brake band 32, one end of which is internally threaded and secured by bolt 33 to the casing 34, the other end being free and moved into and out of braking action by a high pitched screw 35 operated by lever 36, and this lever is connected by a two-part link 37 with lever 28, said link being adjustable by a turnbuckle 39 or equivalent device. The link 37 has at one end a slot 40 to permit a slight idle movement of lever 36 without operating lever 28.

41 and 42 are suitable journals secured in the casing 34 for the driving and driven shafts.

The operation is as follows: The driving shaft 1 is suitably connected to the motor, and the gear wheel 2 is driven at the same speed as shaft 1, which in turning rotates the driven planet pinions 8, the shaft 7 and the planet pinions 9. In the position shown in Fig. 1, where the brake band 32 is loose on the brake member, the driving planet wheels 9 will rotate the loose gear wheel 10 and the internal gear wheel 11 together with its connected part, the pump cylinder 12, in a forward direction to rotate the driven shaft 5 forward and in the same direction as the driving shaft 1 and at the same speed. By moving the lever 36 in the direction of the arrow, the spring 44 pulls arm 43 to operate fork 26 and move the valve member 22 to open the exhaust ports 20 to permit the escape of oil from between the end of the elliptical piston at 15 and the fluid retaining member 18. This movement is such that the clutch pins 29 are withdrawn from their recesses 30 in the piston before the valve begins to release the oil. After the ports are fully open the lever 36 is moved farther in the direction of the arrow, the slots 40 in link 37 permitting such movement without moving the valve, to apply the brake-band 32 to the brake-wheel 6 to hold it stationary, and thereby cause the reversal of the direction of rotation of the driven shaft.

5. In the modification shown in Figs. 6, 7 and 8, the principle of operation is the same, but I have shown a slightly different structure of pump case and piston, the other parts being substantially the same, and their operation identical.

The pump case, or fluid pressure brake, or retarding device, has a cylindrical portion 12ª, in one end of which is the internal gear wheel 11ª, and adjacent thereto the wall 45ª forming one end of the cylinder, the other end of the cylinder being formed by a separate plate 54. The said cylinder 12ª has a portion 55, lune-shaped in section, this portion acting as a retarding or limiting means for the liquid, the piston or rotary member 14ª being circular throughout and having a recess or pocket 56 for the reception of an auxiliary piston 52, there being a space 57 between the piston and pocket for the passage of oil, the auxiliary piston 52 being continually urged into contact with the inner wall of the cylinder.

The piston or rotary member 14ª is shown as formed in one piece with the loose gear wheel 10ª instead of being keyed to it, and said circular piston 14ª is tangent to the crescent-shaped portion 55, between the inlet port 50 and the exhaust port 51. A packing element 15ª is located between these two ports and has an oil passage 58 leading behind the packing from one face of the exhaust port 51, so that oil can pass behind the packing. The greater the pressure of the auxiliary piston 52 on the oil crowded in the space 58 between the piston or rotary member 14ª and the portion 55, the greater will be the pressure of the auxiliary piston 52 on the inner wall of the cylinder 12ª and the pressure of the packing member 15ª on the rotary piston 14ª by reason of the oil being forced through the passages 57 and 58 behind the piston and packing.

Auxiliary oil outlets or perforations 59 are formed in the valve, and they are closed by the axial movement of the valve 22ª sliding on the cylinder 12ª and before the exhaust port 51 is closed. These holes form auxiliary passages to permit the free circulation of oil into and out of the pump cylinder when the mechanism is running idle.

I claim—

1. In a speed changing mechanism, the combination with driving and driven shafts; of gearing between the two shafts, a cylinder, and a rotary piston therein to control the rotation of the gearing.

2. In a speed changing mechanism, the combination with driving and driven shafts; of planet gearing between the two shafts, a rotary cylinder and a rotary piston therein both driven by the planet gearing.

3. In a speed changing mechanism, the combination with the driving and driven shafts; of gearing between the two shafts, a casing for containing a fluid and for said gearing and shafts, a rotary cylinder and a rotary piston therein to control the rotation of the gearing and means to vent fluid from the cylinder into the casing and vice versa.

4. In a speed changing mechanism, the combination with the driving and driven shafts; of planet gearing between the two shafts, a casing for containing fluid and for said planet gearing, fluid pressure mechanism to control the rotation of the planet gearing, means to vent fluid from the fluid pressure mechanism into the casing and vice versa, and means to positively lock the planet gearing against rotation and thereby cause the driving and driven shafts to rotate in unison.

5. In a speed changing mechanism, the combination with the driving and driven shafts; of gearing between the two shafts, a casing for said gearing for containing fluid, fluid pressure mechanism to control the rotation of the planet gearing, a valve to control the passage of fluid to and from the fluid pressure mechanism, and a clutch mechanism controlled by the movement of the valve to lock the gearing against rotation.

6. In a speed changing mechanism, the combination with driving and driven shafts; of gearing between the two shafts, fluid-pressure mechanism to control the gearing, a fluid container, a valve to control the passage of fluid between the container and said mechanism, and a clutch on the valve to lock the fluid pressure mechanism and thereby lock the gearing to cause the two shafts to rotate in unison.

7. In a speed changing mechanism, the combination with driving and driven shafts; of a gear wheel secured to one of the shafts and an internal gear wheel secured to the other shaft and planet gearing connecting the two, a cylinder and a rotary piston therein, both contained within the internal gear wheel to control the planet gearing.

8. In a speed changing mechanism, the combination with driving and driven shafts; of a gear wheel secured to one of the shafts and an internal gear wheel secured to the other shaft, a brake member free to rotate with respect to the shafts, planet wheels mounted on the brake member and gearing with the afore-mentioned gear wheels, fluid pressure mechanism to control the planet wheels, a valve to control the passage of fluid to and from the mechanism, a brake band on the brake member and a single lever to operate the brake band and control the valve.

9. In a speed changing mechanism, the combination with the planet gearing and the internal gear wheel meshing therewith; of a cylinder rotatable in unison with the internal gear wheel, a rotary piston therein geared to the planet gearing and a valve slidable on the cylinder to control the passage of fluid to and from the cylinder.

10. In a speed changing mechanism, the combination with the planet gearing and the internal gear wheel meshing therewith; of a cylinder rotatable in unison with the internal gear wheel, a rotary piston therein geared to the planet gearing, a valve slidable on the cylinder, and a clutch on the valve to lock the piston and internal gear wheel together.

11. In a speed changing mechanism, the combination with the planet gearing and the internal gear wheel meshing therewith; of a cylinder contained in the internal gear wheel, a piston having clutch recesses, in said cylinder free to revolve with respect to the shafts, a gear wheel connected to the piston and meshing with the planet gearing, a valve to control the passage of fluid to and from the cylinder and clutch pins on the valve passing through the cylinder to engage the recesses in the piston.

12. In a speed changing mechanism, the combination with driving and driven shafts, an internal gear wheel secured on the driven shaft, a brake wheel loose on the driven shaft, planet gearing mounted in the brake wheel and driven by the gear wheel on the driving shaft, and engaging the internal gear wheel, a cylinder rotatable in unison with the internal gear wheel and having an eccentric portion on its internal surface, a main piston substantially tangent to said eccentric portion an auxiliary piston in the main piston, a movable packing member in the cylinder means to admit fluid behind the packing member and auxiliary piston, a valve axially slidable on the cylinder having inlet and outlet ports and auxiliary vents, means to urge the valve in open position, a lever to move the valve, a brake band and lever to operate the same, a slotted link connecting the two levers and a casing surrounding the whole device to control fluid for the cylinder.

13. In a speed changing mechanism, the combination with a driving and driven shaft; of means to control the relative speed of the driven shaft comprising a cylinder rotating in unison with one of the shafts, and a rotary piston therein, gearing connecting the piston and the other shaft, and means to control the passage of a non-compressible fluid between the piston and cylinder.

14. In a speed changing mechanism, the combination with two alined shafts; of a cylinder on one of said shafts, a rotary piston therein, gearing connecting the piston and other shaft, a valve to control the admission of fluid to the cylinder, and means to lock the piston and cylinder to rotate in unison.

15. In a speed changing mechanism the combination with two shafts; of a cylinder on one of the shafts having inlet and outlet ports, a valve to control said ports, a rotary piston in the cylinder, gearing connecting the piston to the other shaft and a fluid containing casing surrounding the cylinder and gearing.

16. In a speed changing mechanism the combination with two shafts; of a cylinder on one of the shafts having inlet and outlet ports, a single valve to control the inlet and outlet ports, a piston in the cylinder, gearing connecting the piston to the other shaft, clutch devices on the valve to positively lock the piston and cylinder together and a fluid containing casing surrounding the cylinder and gearing.

17. In a speed changing mechanism, the combination with two shafts; of a cylinder on one of them having inlet and exhaust ports and means to control said ports, a piston in said cylinder, gearing connecting the piston to the other shaft and means coöperating with the gearing to reverse the direction of rotation of the piston.

In testimony that I claim the foregoing as my invention, I have signed my name in presence of two subscribing witnesses.

GEORGE D. MUNSING.

Witnesses:
WM. A. COLLINS,
HARRY SHOWLER.